Oct. 3, 1967   C. B. STOKER, JR   3,344,975
PACKAGE HAVING A TEAR TAB
Filed Oct. 14, 1965

INVENTOR.
CARL B. STOKER, JR.
BY
J.B.Holden
ATTORNEY 3,344,975
PACKAGE HAVING A TEAR TAB
Carl B. Stoker, Jr., Akron, Ohio, assignor to The Goodyear Tire & Rubber Company, Akron, Ohio, a corporation of Ohio
Filed Oct. 14, 1965, Ser. No. 495,930
5 Claims. (Cl. 229—51)

ABSTRACT OF THE DISCLOSURE

Material to be packaged is enclosed in oriented film. A tear tab is cut in the film pointed perpendicularly to the direction in which the film is oriented to serve as a starter for tearing the film to open the package. On pulling the tab, the film tears away from both sides of the tab in the direction in which the film is oriented.

---

This invention relates to a wrapper of an oriented film provided with a tear tab, a package formed from such a wrapper, the method of forming the package and the method of opening a package which includes such a wrapper.

It is well known that the physical characteristics of certain films are changed by stretching. Such films may be stretched so that they tear more easily in one direction than in the direction perpendicular thereto. Such films are referred to herein as "oriented films." It is realized that in the industry "oriented" is sometimes used to mean merely that a film has been stretched without reference to the effect of the stretching, but the term is used herein only in the more limited sense to refer to films to which a grain has been imparted by stretching so that they tear more easily in one direction than in the direction perpendicular thereto. Some films are oriented by stretching in only one direction; others which are stretched in directions perpendicular to one another are oriented by being stretched to a greater extent in one direction than in the other direction, or by being stretched first in one direction and then in the other direction sufficiently to effect orientation.

When an oriented film is used in a package, if a tear tab (preferably a "V" tab) is formed in the film by slitting it, with the tab directed perpendicularly to the direction in which the film has been oriented, and the wrapped package is heated sufficiently to cause the film to shrink against the package material, the tab will shrink more than the surrounding film because it is not held under tension. On shrinking, a small gap is formed between the slit edges of the tab and the surrounding film. The tab is thus made readily visible and is easily accessible when one wishes to open the package.

The tab is formed in the film at any desirable step in the process. It may be formed during the production of the film or just prior to the package overwrap, or at any other desirable time.

Although the invention is described more particularly as applied to oriented vinyl film, it is applicable to other oriented films such as oriented films of polyethylene, rubber hydrochloride, etc.

The invention is further described in connection with the accompanying drawings, in which—

Figure 1:
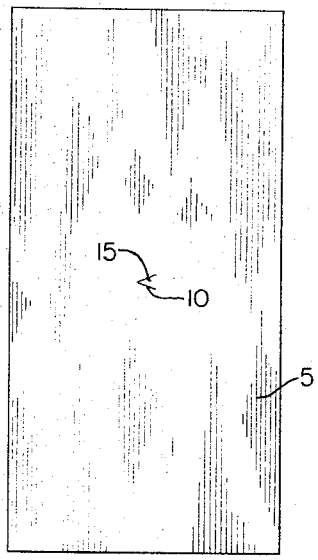
Figure 2:
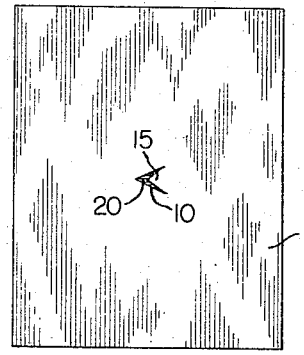
Figure 3:
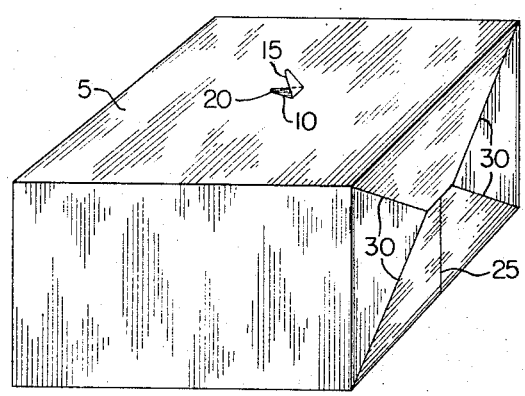
Figure 4:
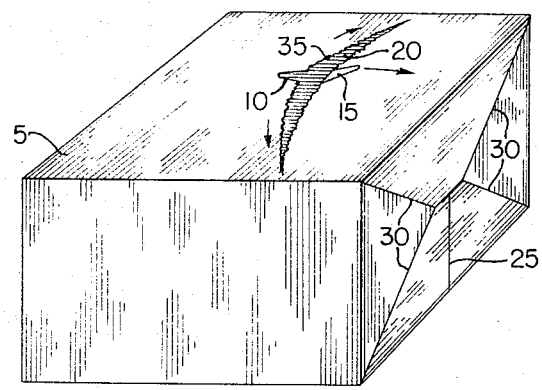
Figure 5:
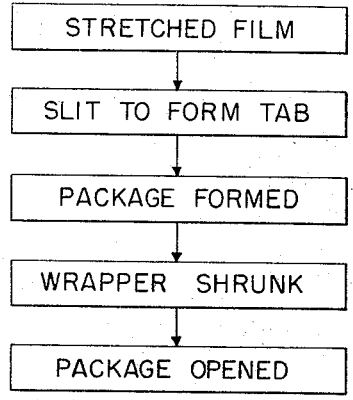

FIGURE 1 is a plan view of an oriented film wrapper;
FIGURE 2 is a top view of a package wrapped in the film, after heating;
FIGURE 3 is a view in perspective of the same with the tab lifted;
FIGURE 4 is a view of the same as the wrapper is being torn to open the package; and
FIGURE 5 is a flow sheet which gives the processing steps.

In the various figures, the shade lines indicate the direction in which the vinyl or other wrapping film 5 has been oriented. As an illustration, this film may be a polyvinylchloride film which contains 8 to 25 percent of diisooctylphthalate, and which has been oriented by stretching in one direction to double its original area. The V-shaped slit 10 is cut into the film with the V pointing perpendicularly to the direction in which the film has been oriented. The V-cut forms the tab 15. The slit may be semi-circular, right-angle or any other shape which forms a projecting tab.

FIGURES 2 to 4 show a package which, as an illustration, may be a box 20 covered with the film 5. The wrapper has been folded around the box, the overlapped seam 25 has been sealed, preferably with heat. Then the film has been folded over each end of the box and the overlapping portions have been sealed together adjacent the lines 30, preferably with heat.

This package is heated to cause the film to shrink tightly on the box. Simultaneously, the tab shrinks and draws away from the surrounding film area, exposing the box 20 through the slit, as shown in FIGURES 2 and 3. The package is conveniently heated by passing it through a shrink tunnel heated to the temperature required to cause the film to shrink.

To open the package, one grasps the tab 15 and pulls it. The film tears simultaneously in opposite directions, following, in a general way, the grain produced by orientation. This forms the openings 35. As the pull is continued beyond the situation pictured in FIGURE 3, the tear is propagated in opposite directions until the wrapper has been torn sufficiently to permit the removal of the box.

Although the drawing illustrates the invention as applied to a wrapper for a single package, the wrapper may be used for bundling a plurality of packages or items, such as pencils, etc.

The invention is covered in the claims which follow:
What I claim is:

1. A package which includes a wrapper of film oriented to an extent sufficient to affect the direction in which a tear of the film is propagated, the edges of the wrapper being sealed to one another, there being a tear tab cut in the film pointed perpendicularly to the direction in which the film is oriented to serve as a starter for tearing the film to open the package.

2. The package of claim 1 which has been heated and the tab has shrunk away from the film at the cut.

3. The package of claim 1 in which the wrapper film is essentially plasticized polyvinylchloride.

4. A flat, oriented, film wrapper oriented in one direction to an extent sufficient to affect the direction in which a tear in the film is propagated and having a tear tab cut therein which points perpendicularly to the direction the film has been oriented.

5. The wrapper of claim 4 which is composed essentially of plasticized polyvinylchloride film.

References Cited

UNITED STATES PATENTS

| 2,261,875 | 11/1941 | Dunn | 215—38 |
| 2,781,900 | 2/1957 | Snyder et al. | |
| 3,175,752 | 3/1965 | Stabenow | 229—51 |
| 3,186,628 | 6/1965 | Rhode | 229—51 |
| 3,261,538 | 7/1966 | Jones et al. | 229—51 |

JOSEPH R. LECLAIR, Primary Examiner.

DAVIS T. MOORHEAD, Examiner.